United States Patent
Inoue et al.

[11] Patent Number: 5,856,041
[45] Date of Patent: Jan. 5, 1999

[54] SEALED SECONDARY CELL

[75] Inventors: Hiroshi Inoue, Neyagawa; Shinji Hamada, Hirakata; Noboru Ito, Kadoma; Munehisa Ikoma, Shiki-gun, all of Japan

[73] Assignee: Matsushita Electric Industrial Co., Ltd., Osaka, Japan

[21] Appl. No.: 734,341

[22] Filed: Oct. 21, 1996

[30] Foreign Application Priority Data

Oct. 20, 1995 [JP] Japan .................................. 7-272216

[51] Int. Cl.⁶ .............................. H01M 2/08; H01M 2/30
[52] U.S. Cl. ........................................... 429/182; 429/184
[58] Field of Search ..................... 429/181, 182, 429/184

[56] References Cited

U.S. PATENT DOCUMENTS 1,453,791  5/1923  Gossling .

FOREIGN PATENT DOCUMENTS

| 0 139 834 | 5/1985 | European Pat. Off. . |
| 2 382 773 | 9/1978 | France . |
| 2 651 606 | 3/1991 | France . |
| 49-88221 | 7/1974 | Japan . |
| 54-171143 | 12/1979 | Japan . |
| 55-143776 | 11/1980 | Japan . |
| 57-15356 | 1/1982 | Japan . |
| 57-19969 | 2/1982 | Japan . |
| 57-23869 | 2/1982 | Japan . |
| 57-34651 | 2/1982 | Japan . |
| 59-114750 | 7/1984 | Japan . |
| 61-42776 | 3/1986 | Japan . |
| 61-99966 | 6/1986 | Japan . |
| 1-124953 | 5/1989 | Japan . |
| 2 133 609 | 7/1984 | United Kingdom . |

OTHER PUBLICATIONS

European Search Report dated Jan. 27, 1997.

*Primary Examiner*—John S. Maples
*Attorney, Agent, or Firm*—Ratner & Prestia

[57] ABSTRACT

A sealed secondary cell maintaining enclosed property and battery performance for a long period in a wide range of environments of use including high temperature, high humidity, and vibration is presented. A terminal pole is composed of a current collector, a flange with a flat top surface, and a pole formed on the flange upper surface projecting at right angle, a rotation arresting portion of the terminal pole is formed by the flange and lower side of a lid, an annular packing is disposed between the flange upper surface and lid lower side so as to surround the pole, an annular pressing spring is pressed in from above the pole, the annular packing interposed between the flange upper surface and lid lower side is compressed in the vertical direction by the elastic force of the annular pressing spring, the annular pressing spring is stopped on the outer circumferential edge of the pole at a position for sealing and fixing the terminal pole in the lid, and thereby the battery jar is enclosed.

39 Claims, 7 Drawing Sheets

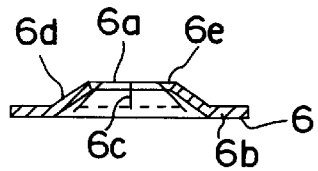
F I G. 4 (A)
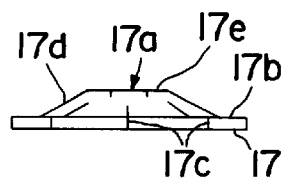
F I G. 4 (C)
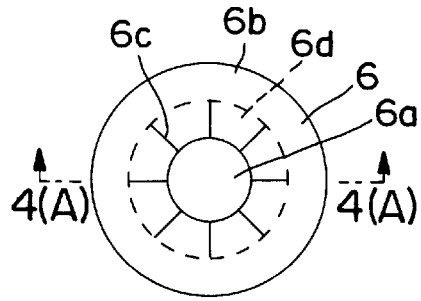
F I G. 4 (E)
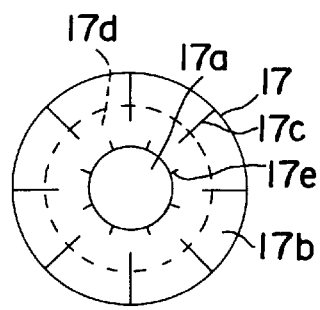
F I G. 4 (G)
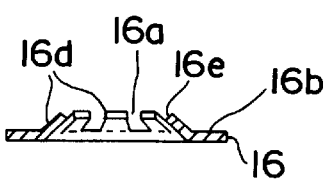
F I G. 4 (B)
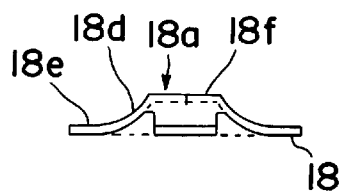
F I G. 4 (D)
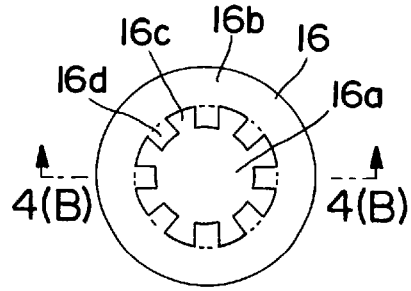
F I G. 4 (F)
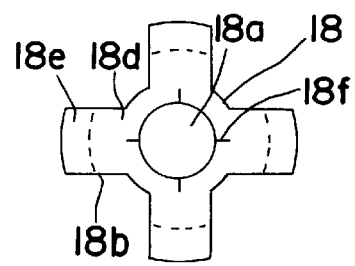
F I G. 4 (H)

SEALED SECONDARY CELL

BACKGROUND OF THE INVENTION

1. Field of the Invention

The present invention relates to a sealed secondary cell having a terminal pole serving also as an external terminal.

2. Prior Art

Hitherto, the majority of demands of secondary cells were occupied by small cells used as the power source of portable appliances such as VTR camera, and the technical development has been promoted mainly in the direction of smaller size and larger capacity. Recently, however, there is an increasing demand for stationary secondary cells used as emergency power source such as no-break power unit installed in a computer system, secondary cells as mobile power supply used in electric vehicle (EV) developed as environmental protection or energy-saving measure, and high performance secondary cell of medium capacity or large capacity ranging from scores to hundreds of Ah (ampere-hours). In particular, the secondary cell used in EV or other mobile use is required to satisfy the acceleration equal to the internal-combustion engine such as gasoline engine, high output characteristic and high energy density to withstand a large current load of 100 A (amperes) or more to obtain a sufficient traveling distance, and high reliability enclosed structure of a long maintenance-free period for the ease of handling. Research and development efforts continue with respect to sealed nickel-cadmium storage cells, nickel hydrogen storage cells, alkaline secondary cells, and lithium secondary cells, among others, as batteries which surpass the performance of the improved type lead storage cell hitherto considered for use in EV. To enhance the output characteristic of these batteries, however, it is desireable to improve the characteristics of positive and negative plates, while considering the optimal structural conditions of the plate group, such that the electric power obtained from the plate group is delivered to the external terminal of the battery with minimal power loss. Accordingly, it is desireable to decrease the electric resistance of the connection between plural lead plates and the external terminal of the battery and keep the resistance between the external terminal and external coupling plate as low as possible. Moreover, to meet the demand for an enclosed battery having high reliability, a joining method is required which can connect an external terminal to the battery lid with a seal which is air-tight and liquid-tight.

In conventional alkaline secondary cells or lithium secondary cells which are enclosed and have medium to large cell capacities as discussed above, typically terminal poles were employed which have the same or similar shapes as those used in vent type nickel-cadmium storage batteries having low Ah ratings (i.e., less than 100 Ah). The size, material, or design of these batteries were changed depending on the battery capacity or the like. Various examples of alkaline storage battery terminal pole structures are disclosed, for example, in Japanese Laid-open Utility Model 49-88221, Japanese Laid-open Utility Model 57-23869, and Japanese Laid-open Utility Model 61-99966. An essential lateral sectional view near terminal unit of a conventional alkaline storage battery is shown in FIG. 9.

The terminal unit shown in FIG. 9 is a screw tightened terminal.

In FIG. 9, a terminal pole 62 is formed by connecting a current collector 62c for connecting a flange 62b and plate lead plate to the lower end of a pole 62a having threads 62d, integrally by cutting, or fabricating separately and welding.

The material for the terminal pole 62 is, when applied in an alkaline secondary cell, generally nickel plated steel, nickel alloy, or other corrosion resistant metal. A lid 61 is made of a synthetic resin. In a pole insert hole 6a provided in the lid 61, the pole 62d of the terminal pole 62, and two annular packings 63a, 63b are inserted, and the terminal pole 62 is tightened and fixed to the lid 61 by tightening a nut 65 on the threads 62d provided in the pole 62a through a metal washer 64. The annular packings 63a, 63b are made of synthetic rubber or synthetic resin. In this prior art, the external terminal is formed by a step 62e and a terminal screw 62f provided in the upper part of the pole 62a, and a perforated coupling plate is disposed in the step, so as to be connected by screwing. In these cell systems, the terminal poles are mostly fixed by screwing on the lid, and by the use of integrated terminal pole, the electric resistance from the plate group to the external terminal portion is lowered.

In this conventional structure, thread cutting of the nut 65 and pole 62a and tightening of nut are desireable, and the labor is complicated. To eliminate this defect, without using the nut 65 for tightening the pole, a vent type alkaline storage battery in a structure for fixing the terminal pole by using an annular spring having a central opening is proposed (Japanese Laid-open Utility Model 54-171143). An essential lateral sectional view near the terminal unit of this vent type alkaline storage battery is shown in FIG. 10 (A), and a perspective view of the annular spring composed in the terminal unit is shown in FIG. 10(B).

In FIG. 10(A) and FIG. 10(B), a terminal pole 72 is composed of a pole 72a, a step 72b of circular flange form abutting against the lower side of a lid 71, and a current collector 72c. The pole 72a projects outward through an insert hole 71a provided in the lid 71, and a rubber annular packing 73 for keeping airtight between the pole 72a and insert hole 71a is mounted on an annular step 71b of the lid 71, and a washer 74 is placed on the packing 73. A central opening 75a of an annular spring 75 is inserted into the pole 72a, and is pressed in to penetrate through. In this case, a spring upper end 75b is inserted and fixed in an annular groove 72d provided in the middle peripheral edge of the pole 72a, and the annular packing 73 held between the lid 71 and washer 74 is pressed and deformed in the radial direction, by an elastic force of the annular spring 75 against the step 72d of the terminal pole 72, and an extended portion 73a is hit against the pole peripheral edge, and the terminal pole 72 is fixed in the lid 71 while keeping airtight by plugging the gap between the pole 72a and insert hole 71a of the lid 71. In the annular spring 75, as shown in FIG. 10(B), a notch 75d is formed at the upper end (opening) side.

When using the same structure as a conventional small-sized battery of medium to large size, since the required performance and condition of use are severe, it was difficult to maintain the battery performance for a long period by keeping airtight and liquid tight for a long time.

That is, to enhance the output density and energy density of the battery, it is desirable to minimize the electric resistance and suppress the dimension in the height direction as far as possible in design, concerning the terminal pole and its sealing structure. Moreover, in particular, the following conditions for use of the battery are desireable.

(1) At the present, in a narrow space of electric vehicle or the like, about scores to 250 cells are connected in series to be used in high voltage stage. Therefore, if electrolyte leaks out from a terminal or other part of a certain cell, leak current may cause discharge, or lead to short circuit, heat generation, ignition, or electric shock.

(2) The operating ambient temperature is −30° to 50° C. or a wider range, and the reserved heat temperature rise of the battery due to charge and discharge of a large current in a narrow accommodation space is significant. As a result, in high temperature condition, the battery temperature may exceed 70° to 100° C.

(3) A battery life equal to or longer than the life of the appliance (for example, vehicle), 5 to 10 years or longer, is desireable.

The problems in the prior art are described below.

First, in the terminal pole by screw fixing shown in FIG. 9, the inventors were aware that problems occurred in the screw tightening process. That is, between the pole 62a and the pole insert hole 61a for inserting the pole 62a, there is a slight gap for the ease of processing and assembling of parts. The nut 65 for tightening must be relatively thin as compared with the screw diameter, as shown in the drawing, in order to enhance the battery energy density. To realize a battery of large size and large capacity, the pole 62a must be thick and large, and hence the screw diameter for fixing the pole increases, thereby increasing the thread pitch and play. In such constitution of parts, by rotating the nut 65, when compressing spherical packings 63a, 63b such as O-rings to a thickness of about ⅓ to ½, the nut 65 may be tightened at an inclination of angle θ as shown in FIG. 8. This problem tends to expand further in mass production. In such screw tightening state, tightening of the annular packings 63a, 63b is uneven, and the air tightness or liquid tightness of the pole may be lowered, and leakage may occur in an early phase. Besides, as mentioned above, when inserting the perforated coupling plate into the terminal screw 62f above the pole 62a to mount onto the step 62e, and tightening the nut to connect the terminal screw 62f to the coupling plate to couple between cells, in order to lower the connection resistance in the coupling portion, it is desireable to tighten the coupling plate firmly, and the nut is tightened to a torque of about 70 to 200 kgf-cm. At this time, the torque is transmitted to the whole pole through the pole 62a, and the plate group connected to the current collector 62c receives a torsional stress through plural lead plates, which may lead to short circuit between plates, or lowering of characteristic or breakage due to disconnected of welding of lead plates. On the other hand, in the method of tightening by putting the perforated coupling plate directly on the upper side of the nut 65, without forming step in the pole 62a, the nut may be rotated together to lower the air tightness, or the nut may be tightened obliquely, and the contact resistance increases. Or, in a method of tightening by using a strap nut serving also as pole and current collector, without using metal washer 64, in the state of holding the lid by two annular flat packings made of resin, the rotating nut flaws the packing. If dust deposits, this phenomenon is intensified, and anyway the tightness is lowered.

In a proposed improved vent type alkaline storage battery as shown in FIG. 10(A), simplification of labor is intended by eliminating screw tightening in fixing of pole. As mentioned above, the rubber annular packing 73 is compressed in the vertical direction by pressing force of the annular spring 75 through the washer 74, and is deformed in the radial direction, and the extended portion 73a of the packing caused by this abuts against the peripheral edge of the pole 72a so as to seal tightly. In this method, the sealing capability is determined by the pressing force and its duration of the leading end of the extended portion 73a in vertical free state abutting against the pole 72a. In other words, the sealing capability is determined by the repulsive elastic force of the rubber annular packing 73, and its compression rate, and the packing material is a dominant element. As the material for the annular packing 73, synthetic rubber or resin having rubber-like elasticity is used, but in this case, as in the above structure, when sealing at the extended portion of the packing, it was difficult to obtain a sufficient pressing force in the area by the repulsive elastic force alone. The vent type alkaline storage battery is used in an application where electrolyte supplement and cleaning are possible, and it is designed to exhaust the gas generated during overcharge through a low pressure exhaust valve or the like. In this vent type alkaline storage battery, the battery internal pressure is low, being less than 1 kgf/cm$^2$, and hence there was no problem in sealing even in the terminal pole fixed structure as in FIG. 10(A).

In that sealed secondary cell, especially in the alkaline secondary cell, the internal pressure is usually 2 to 5 kgf/cm$^2$ due gas generated in the battery, or reaching around 10 kgf/cm$^2$ in a specific condition. Accordingly, in such a method of sealing by the extended portion 73a of the packing as mentioned above, the leading end of the extended portion 73a is lifted from the peripheral edge of the pole 72a by the internal pressure, and gas leaks and mist-like electrolyte leaks out onto the surface of the lid 71, and as a result the characteristic is lowered and handling troubles are likely to occur, and hence it was difficult to assure the quality. To increase the pressing force at the leading end of the extended portion 73a of the packing, there is means for increasing the compression rate of the annular packing 73. However, if the compressive rate of the annular packing 73 is large, the compressive permanent strain rate of the packing material increases, and hence creep phenomenon (plastic deformation) occurs in a short period, and the sealing performance is lowered. Besides, in the wide range of battery operating temperature, especially in summer when the battery temperature may exceed 70° C., deterioration of packing material is added, and the creep phenomenon is amplified and the pressing force decreases significantly, and hence it was further difficult to maintain the sealing performance for a long period. It also may be required to decrease the dimensional tolerance of the inner and outer diameter of the annular packing 73, outer diameter of the pole 72a and diameter of the annular step 71b of the lid 71. If the dimensional tolerance is large, a runout may occur between the annular packing 73 and pole 72a, and hence uneven pressing force of the extended portion 73a of the packing takes place and the air tightness may drop.

A lateral sectional view near the terminal unit in another conventional vent type alkaline storage battery is shown in FIG. 11. The sectional view shown in FIG. 11 is a structure of fixing a terminal pole 82 to a lid 81 by using an annular spring 85, same as in the prior art shown in FIG. 10(A). Annular packings 83c, 83b are disposed on upper and lower sides of the lid 81, and the upper and lower stages abut against the peripheral edge of the pole 82a. In such a structure, leakage of electrolyte is decreased. In the vent alkaline storage battery shown in FIG. 11, as in the prior art in FIG. 10(A), the lid 81 is provided with an insert hole 81a for insert made of synthetic resin and the pole 82a, and annular types 81b, 81c are provided, as shown in the drawing, in the upper and lower corners of the insert hole 81a. The terminal pole 82 is formed by integrally assembling a columnar pole 82a having a terminal for connecting a coupling plate in the upper part, and a disk-shaped flange 82b abutting against the terminal pole 82 at the lower side of the lid 81 at the lower part, and a current collector 82c is provided at the lower end. The upper and lower annular packings 83c, 83b are rubber-made O-rings. By the elastic force of the spring occurring between the annular spring 85 and the flange 82b of the pole, the lower annular packing 83b is pressed between the flange 82b of the pole and the lower taper 81b of the lid 81, and the upper annular packing 83c is pressed between the washer 84 and the upper taper 81c. At this time, the spherical packings 83b, 83c are pressed by the tapers 81b, 81c so as to fill up the gap between the penetration hole 81a and pole peripheral edge, and deformed by receiving a stress inward in the radial direction by the tapers 81b, 81c, thereby abutting against the pole peripheral edge. Thus, when applied in the storage battery of low internal pressure such as vent type, by using double annular packings, an effect is noted in suppression of leakage of electrolyte by capillary action as compared with the prior art in FIG. 10(A). It is, however, same as in the constitution in FIG. 10(A) that the clearance in the pole peripheral edge is sealed by the elastic force (rubber elasticity) of the annular packings 83b, 83c themselves, and therefore physical properties are lowered by aging effects of packing material and high temperature deterioration, and a sufficient air tightness is not obtained at the battery internal pressure of 3 to 5 kg/cm$^2$ or higher, and the balance of battery composition may be broken due to gas leak in a long course of use, which resulted in deterioration of battery performance due to decrease of electrolyte, and leakage of electrolyte. Owing to such reasons, it was improper to apply the terminal structure as shown in FIG. 10 into the novel sealed secondary cell. As the terminal structure of secondary cell, the structure of forming the pole and lid hole in a taper form narrow at the upper side and putting the O-ring into the taper clearance (Japanese Laid-open Patent 57-15356), and the structure of forming the lid hole and rubber packing in an outward open taper form, and tightening the packing by screw (Japanese Laid-open Utility Model 61-42776) have been proposed among others, but anyway the occupied dimension in the height direction is large, the energy density is lowered, and the same problems as in the prior art shown in FIG. 10 and FIG. 9 are present, and hence it is difficult to apply in the novel sealed secondary cell.

Moreover, in the terminal structure shown in FIG. 10(A) and FIG. 11, since the pole is fixed to the lid only by the pressing force of the annular spring, same as in the prior art in FIG. 9, when connecting the coupling plate by tightening the nut, the current collectors 72c, 82c receive a torsional stress by external pressure such as torque, and hit stress is larger than in the terminal structure of the screw tightening type in FIG. 9, and moreover the plate group may be short-circuited inside, and factors for deterioration of battery are involved, and handling of the battery is made difficult.

It is hence a primary object of the invention to solve the problems of the conventional fixing method of terminal pole, and present a sealed secondary cell of medium to large capacity, capable of exhibiting a stable battery performance for a long period in environments including high temperature.

SUMMARY OF THE INVENTION

A sealed secondary cell of the invention comprises:

a battery jar forming an opening, a plate group having a positive plate and a negative plate, accommodated in the battery jar, electrolyte impregnated in the plate group, a lid disposed so as to thus the opening of the battery jar, and forming a hole, and a terminal pole disposed by penetrating through the hole, and electrically connected to one of the positive plate and negative plate.

The terminal pole integrally forms:

a flange of a flat plate, a pole formed on a first upper surface of the flange projecting vertically, and a current collector formed at the lower side of the flange, and the flange is positioned at the lower side of the lid, and the pole projects upward from the hole formed in the lid, and thereby the terminal pole is disposed.

The current collector is connected to one plate.

An annular packing is disposed between a second upper surface of the flange and the lower side of the lid, at a position surrounding the pole.

An annular pressing spring having an opening of an inner diameter smaller than the maximum outer diameter of the pole is pressed in from above the pole, the pole has stopping means in at least a part of its outer circumference, and the inner circumference of the opening of the annular pressing spring is stopped by the stopping means.

The annular packing is compressed in the vertical direction by the elastic force of the annular pressing spring, the second upper surface of the flange and the lower side of the lid are enclosed by the annular packing, and the terminal pole is fixed to the lid.

In this constitution, preferably, the flange has an engagement portion, the lid as a rotation preventive portion, and the engagement portion and the rotation preventive portion are engaged with each other, thereby forming a rotation arresting portion of the terminal pole.

In this constitution, preferably, an annular groove is formed in the second upper surface of the flange of the terminal pole, and the annular packing is placed in this annular groove.

In this constitution, preferably, the stopping means is a biting flaw formed on the outer circumference of the pole when pressing in the pressing spring, and the inner circumference of the opening of the annular pressing spring is stopped in the state caught in the biting flaw of the pole. More preferably, the surface hardness of the pole of the terminal pole is smaller than the hardness of the end portion of the opening of the annular pressing spring, by 100 Hv or more as Vickers hardness, and the surface hardness of the pole is in a range of Hv 150 to Hv 350.

In this constitution, preferably, the inner diameter of the opening of the annular pressing spring is 0.05 mm to 0.4 mm smaller than tile outer diameter of the pole at the stopping position of the annular pressing spring.

In this constitution, preferably, the stopping means is an annular groove or step formed on the outer circumference of the pole, the opening of the annular pressing spring is stopped in this groove or step, and the depth of the groove or step is 0.02 mm to 0.1 mm.

In this constitution, preferably, the pressing force of the pressing spring applied between the second upper surface of the flange and the lower side of the lid is in a range of 50 kgf to 600 kgf.

In this constitution, preferably, a sealing agent is composed between the second upper surface of the flange and the lower side of the lid, and the sealing agent is made of a flowable material.

In this constitution, preferably, the current collector forms a convex portion extended in the horizontal direction from one end of the flange, and one plate of the positive plate and negative plate is connected to this convex portion.

In this constitution, preferably, the pole has male threads formed on its upper surface, the outer diameter of male threads is smaller than the outer diameter of the pole, and the base of the male threads has a step of a flat plane parallel to the direction of diameter of the pole.

According to the above constitution, the annular ring is interposed between the lid lower side and flange upper surface of the terminal pole, and is compressed to a specific state, by always receiving a specific pressing force by the elastic force of the annular pressing spring. By this annular packing, the lid lower side and the flange upper surface are sealed. Moreover, by controlling the elastic force of the annular pressing spring over a specific value, the sealing capability of the sealing and fixing portion of the terminal pole is extremely enhanced. For example, a sealing capability withstanding a battery internal pressure of 5 to 10 kgf/cm$^2$ or more is obtained. If, still more, the annular packing itself is lowered in the sealing function due to high temperature deterioration of packing material, and increase of compression permanent set due to aging effects, the annular packing always maintains the sealing function by the pressing force of the annular pressing spring, and therefore the initial air and liquid tightness is maintained for a long time, without practically lowering, in a wide temperature range.

By the rotation arresting portion of the terminal pole, the terminal pole is securely restrained of rotation about the lid. Therefore, when fixing the coupling plate to the terminal pole by tightening screw, when detaching or attaching in an electric vehicle, or during use, the torsional stress due to external torque generated by vibration or the like is not transmitted to the lead plate and plate connected to the current collector of the terminal pole, and as a result it is effective to prevent lowering of battery characteristic due to torsional stress, short-circuiting in the battery, and drop of sealing performance in the terminal pole fixing portion.

In addition, by properly selecting the surface hardness and dimensions of the pole of the terminal pole, and the opening of the annular pressing spring to be fitted therein mutually, the pressing spring opening can be securely stopped at specified position of the pole. Therefore, when exposed to external force due to vibration or impact of assembling the batteries into the appliance or disassembling, loosening of the stopping portion does not occur, and the sealing performance between the lid lower side and flange upper side may be always steadily maintained.

Further, by disposing a specified sealing agent film layer between the upper surface of the flange contacting with the annular packing and the lid lower side, the liquid tightness is further improved. Therefore, when the batteries are used in the environments of high temperature and high humidity, or drastic temperature changes, leakage of electrolyte due to capillary action can be suppressed for a long period.

The battery volume efficiency can be improved by projecting and forming the current collector at one side of the flange.

BRIEF DESCRIPTION OF THE DRAWINGS

FIG. 4(A), FIG. 4(B), FIG. 4(C), and FIG. 4(D) are sectional views and plan views showing various annular pressing springs of the sealed secondary cell according to a first embodiment of the invention;

Figure 1A:
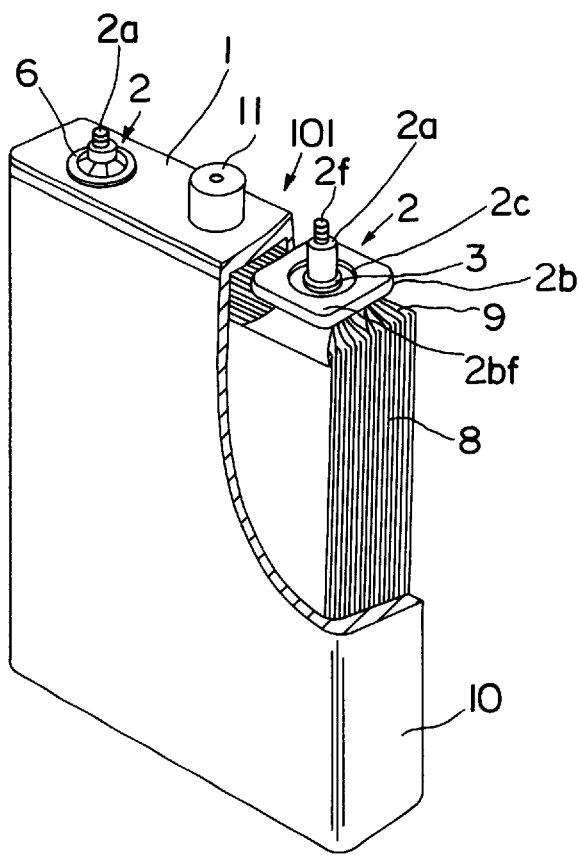
FIG. 1(A) is a perspective view of a sealed secondary cell in a first embodiment of the invention.

| REFERENCE NUMERALS | |
|---|---|
| 1, 31, 61, 71, 81: | Lid |
| 1a, 61a, 71a, 81a: | Hole formed in lid |
| 1b: | Sealing portion |
| 2, 12, 22, 32, 37, 52, 55, 62, 72: | Terminal pole |
| 2a, 12a, 22a, 32a, 37a, 52a, 55a, 62a, 72a, 82a: | Pole |
| 2b, 12b, 22b, 32b, 37b, 52b, 62b, 72b, 82b: | Flange |
| 2bf, 52bf: | Upper surface of flange |
| 2c, 32c, 37c, 52c, 55f, 71b: | Groove formed in flange |
| 2e, 52e, 55f, 62e, 72e, 72d: | Step formed in pole |
| 2f, 12f, 32f, 37f, 52g, 62f: | Screw formed in pole |
| 2g, 22g, 32d, 37d, 62c, 72c, 82c: | Current collector |
| 2h: | Hole formed in current collector |
| 2k: | Engaging portion of spring end surface |
| 3, 63a, 63b, 73, 83b, 83c: | Annular packing |
| 4, 4a, 34: | Rotation preventive portion |
| 5: | Sealing agent |
| 6, 16, 17, 18: | Annular pressing spring |
| 6a, 16a, 17a: | Opening of annular pressing spring |
| 6c, 16c, 17e, 18f: | Notch formed in inner circumference of |

-continued

REFERENCE NUMERALS

| | |
|---|---|
| 6b, 16b, 17b, 18e: | pressing spring<br>Outer peripheral flat portion of annular pressing spring |
| 6d, 16d, 17d, 18d: | Slope of annular pressing spring |
| 6e: | Cut in annular pressing spring |
| 7: | Washer |
| 8: | Plate group |
| 9: | Lead plate of plate |
| 10: | Battery jar |
| 11: | Safety valve |
| 12c, 52g: | Tap screw |
| 17c: | Cut formed in outer circumference of annular pressing spring |
| 18b: | Tongue formed on outer circumference of annular pressing spring |
| 22c, 33: | Engaging portion formed in flange |
| 28, 38, 58: | Rotation arresting portion of terminal pole |
| 35: | Weld zone |
| 37e: | Linkage part of flange |
| 62d: | Thread |
| 65, 68, 98: | Nut |
| 69, 99: | Coupling plate |
| 74: | Washer |
| 75, 85: | Spring |
| 75a: | Central opening of spring |
| 75b: | Spring upper end |
| 75d: | Cut in spring |
| 81b, 81c: | Taper of spring |
| 101: | Sealed secondary cell |

DETAILED DESCRIPTION OF THE INVENTION

The sealed secondary cell of the invention may be applied to a sealed secondary cell of alkaline secondary type or lithium secondary type having a terminal pole of medium to large capacity. Its form is not particularly limited, and it may be applied in a general square shape, cylindrical shape, or elliptical shape. Referring now to FIG. 1 through FIG. 7, a first embodiment is described in detail below, which mainly relates to a square sealed alkaline storage battery with electric capacity of about 50 to 150 Ah chiefly studied as the power source for an electric vehicle.

As the first embodiment, FIG. 1(A) is a perspective view showing various parts, cutting away part of the battery jar of a completed product of a square sealed alkaline secondary cell of 120 Ah enclosed by using a battery jar of flat square tubular form and a lid. A plan view of the upper surface of the lid is given in FIG. 1(B). FIG. 2 is a sectional view of the terminal pole portion as seen from the shorter end side of the battery shown in FIG. 1. FIG. 3(A) is a bottom view of a rotation arresting portion of the terminal pole, and FIG. 3(B) is a bottom view of a rotation arresting portion of the terminal pole in other mode.

Figure 1B:
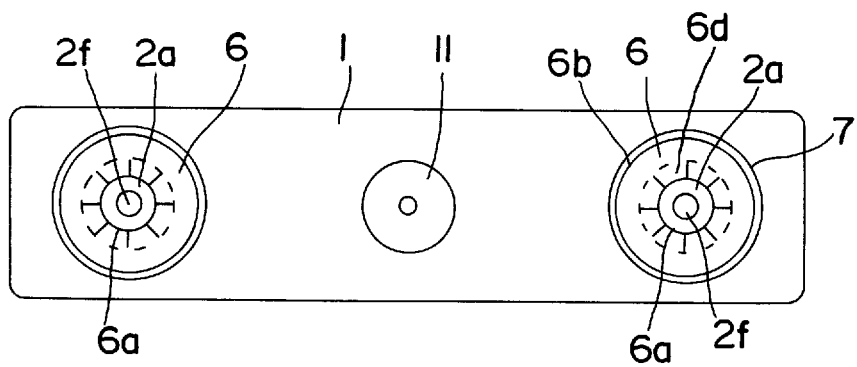
FIG. 1(B) is a plan view of the upper surface of the secondary cell shown in FIG. 1(A)
Figure 2:
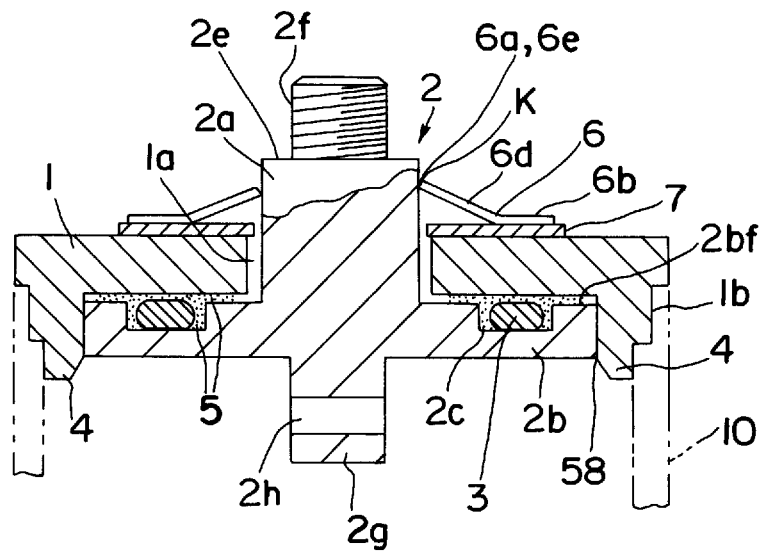
FIG. 2 is a sectional view of the terminal unit of the sealed secondary cell according to the first embodiment shown in FIG. 1(A) and FIG. 1(B)
Figure 3A:
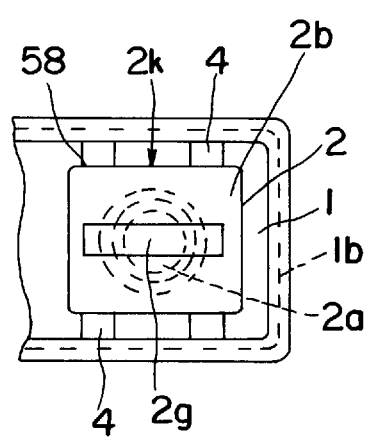
FIG. 3(A) shows a rotation arresting portion of a terminal pole of the terminal unit shown in FIG. 2.
Figure 3B:
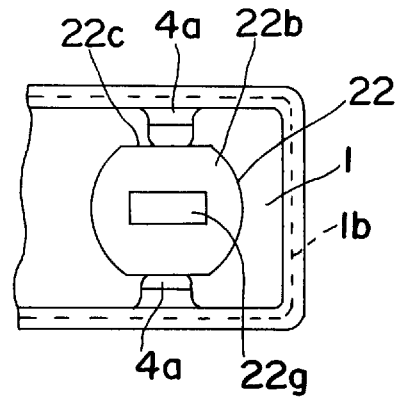
FIG. 3(B) is a bottom view of an additional embodiment of a rotation arresting portion.

In FIG. 1(A), FIG. 1(B), and FIG. 2, a sealed alkaline secondary cell 101 is composed of a battery jar 10, an plate group 8 contained in the battery jar 10, electrolyte, and a lid 1 installed at the opening of the battery jar 10.

The plate group 8 is composed by laminating a positive plate filled with nickel active substance such as nickel hydroxide, and a negative plate filled with cadmium hydroxide or hydrogen occlusion alloy or the like, in plural layers through a nonwoven fabric separator, and impregnating a specific volume of alkaline electrolyte. The battery jar 10 is a square tube made of synthetic resin for containing the plate group 8 and electrolyte. The lid 1 of the synthetic resin forms two terminal holes 1a, individual poles 2a of a pair of terminal poles 2 as terminals of positive pole and negative pole are inserted into the terminal holes 1a together with an annular packing 3, and are fixed to the lid 1 through an annular pressing spring 6. To guarantee safety, a safety valve 11 which operates in case of abnormal rise of internal pressure of the battery jar 10 is built in the lid 1. The valve operating pressure of the safety valve 11 is 5 kgf/cm$^2$ to 10 kgf/cm$^2$. Plural lead plates 9 are led out from the positive plate and negative plate of the plate group 8, and lead plate 9 is connected to current collectors 2g of positive and negative terminal poles 2, respectively, by welding, riveting, or screwing. The lid 1 fixing the terminal pole 2 is mounted on the opening of the battery jar 10 containing the plate group 8, and is integrally affixed to the opening end of the battery jar by adhesion, heating fusion or other means, thereby enclosing the battery jar.

A screw 2f is formed in the upper part of the pole 2a.

The composition and method of sealing and fixing the terminal pole 2 on the lid 1 are described below sequentially while referring to FIG. 1(A), FIG. 1(B), FIG. 2, and FIG. 3(A).

The terminal pole 2 is composed by integrally forming a flange 2b of square flat plate, being made of conductive material having resistance to alkaline corrosion such as nickel plated iron material or pure nickel, pole 2a on the upper surface of the flange 2b, annular groove 2c formed on the peripheral edge of the pole 2a, and a current collector 2g at the lower side of the flange 2b. The pole 2a serves also as external terminal. An annular packing 3 is placed in the annular groove 2c. In the lid 1 having plural lead plates connected to the current collector 2g, protrusions of fixed rib rotation blocking portion 4 are provided at positions abutting against positive and negative terminal holes 1a and engaging portions 2k of two sides of the flange 2b. By the engaging portions 2k and rotation blocking portion 4, a rotation arresting portion 58 is formed. Near the current collector 2g, a hole 2h is formed. In the battery jar 10, a sealing portion 1b is provided for affixing to the battery jar 10. The annular pressing spring 6 is made of stainless steel plate for spring or steel plate for spring, and has an opening 6a of a slightly smaller diameter than the outer diameter of the pole 2a, a slope 6d having a notch 6c shown in FIG. 4, and an outer flat portion 6b for applying pressing force. The washer 7 is made of nickel plated steel plate. The annular packing 3 is an O-ring with a circular or elliptical section. As the annular packing 3, as far as the diameter is larger than a specific size, an O-ring having a square section may be also used. The material of the annular packing may include ethylene propylene rubber, nitrile rubber, fluororubber, butyl rubber, other synthetic rubber, thermoplastic elastomer of styrene or olefin derivative, and polytetrafluoroethylene, among others.

A sealing agent 5 is placed between the flange 2b and lid 1, and around the annular packing 3.

The assembled constitution using the above constituent parts is described below by reference to FIG. 2. The annular packing 3 is fitted into the annular groove 2c of the flange upper surface 2bf of the terminal pole 2, the pole 2a is inserted from the lower side of the terminal hole 1a of the lid 1, and the opening 6a of the annular pressing spring 6 is pressed into the pole 2a projecting to the upper surface of the lid 1 through the washer 7. At this time, the opening 6a is pressed into the position until the pressing force of the pressing spring 6 for compressing the annular packing 3 between the flange upper surface 2bf and the lower side of the lid 1 in the vertical direction becomes 350 kgf, and at this time of pressing in, a biting flaw is formed in the pole 2a, and by putting a cut 6e of the opening 6a into the surface biting flaw of the pole 2a, the opening 6a is stopped on the pole 2a at position K. This biting flaw serves as stopping means. In this way, the terminal pole 2 is sealed and fixed in the lid 1. A step 2e and a screw 2f are formed also in the pole 2a. In this constitution, the following three points are desirable for executing the invention effectively, that is, the magnitude of the pressing force by elastic force of the annular pressing spring 6 applied between the flange upper surface 2bf of the terminal pole 2 and the lower side of the lid 1, the relation between surface hardness of the pole 2a and the hardness of the cut 6e of the opening 6a of the annular pressing spring 6, and the relation between the diameter of the opening 6a of the annular pressing spring and the outer diameter near the stopping position of the opening 6a of the pole 2a.

These three points are described below.

The pressing force of the pressing spring 6 applied between the flange upper surface 2bf and the lower side of the lid 1 is preferred to be set in a range of 50 kgf to 600 kgf. The reason is that the compression rate of the annular packing 3 is small and the sealing capacity is insufficient for the battery internal pressure if the pressing force of the pressing spring 6 is less than 50 kgf. If the pressing force is larger than 600 kgf, on the other hand, the lid 1 may be deformed, or the opening 6a of the pressing spring stopped in the pole 2a may be unevenly deviated from the spring stopping position, and hence the pressing force tends to be unstable. Concerning the second point of the relation the hardness between the surface portion of the pole 2a and the opening cut 6e of the annular pressing spring 6, when expressed in Vickers hardness (Hv), at a depth of 20 to 200 $\mu$m from the pole surface, the hardness is in a range of Hv 150 to Hv 350, and it is desired to lower by Hv 100 or more as compared with the hardness in the portion of the opening cut 6e. As the material for the annular pressing spring, in order to obtain the specified pressing force described stably, stainless steel plate for spring is used, such as SUS 304 CSP and nickel plated steel plate for spring, but since the hardness is in a range of Hv 350 to Hv 600, it is desireable to set the surface hardness of the pole in consideration of such hardness. The opening cut 6e of the pressing spring used in this embodiment is about Hv 400, while the surface hardness of the pole 2a made of nickel plated steel plate was about Hv 150 lower, that is, Hv 250. When this hardness difference becomes less than Hv 100, biting of the opening cut 6e into the pole 2a surface becomes uneven or difficult, and stopping may be insufficient. Or, if the surface hardness of the pole 2a is less that Hv 150, the surface may be cut off when pressing in the pressing spring 6, and the opening 6a may be stopped obliquely, or stopping is difficult. When the surface hardness exceeds Hv 350, the opening cut 6e cannot bite in, and it may slip on the surface to stop insufficiently. This is the same when selecting the pressing spring of high hardness with hardness difference of Hv 100 or more. As for the third point, the diameter of the opening 6a of the pressing spring should be set smaller than the outer diameter near the stopping position of the pole 2a by 0.05 mm to 0.4 mm, and preferably in a smaller diameter in a range of 0.1 mm to 0.3 mm. If this diameter difference is smaller than 0.05 mm, biting of the opening cut 6e is small, and slipping occurs, and specified spring pressing force is not obtained. If the diameter difference is over 0.4 mm, deformation may be caused when pressing in the opening 6a, or the ball surface may be cut off, and the opening 6a may be stopped obliquely, and deviation may be likely to be cause by vibration, and hence it is not preferred.

If the material used for the pole 2a cannot provide such preferred surface hardness, the surface may be covered with thin tubular sheath of nickel or the like, or a metal coating of Hv 150 to 350 may be applied in a thickness of 20 to 50 $\mu$m by deposition or other method. In the case of surface treatment of nickel plating or the like, the hardness may be raised if the treating condition is improper. In the case of nickel, mat plating should be applied, or the hardness should be adjusted by annealing the surface by high frequency heating, etc.

An example of pole rotation arresting portion 58 of the terminal pole 2 is described in FIG. 3(A), but the size and shape of the fixing rib should be set depending on the torque applied to the pole 2a.

When the torque is relatively small, as shown in FIG. 3(B), a pair of flat engaging portions 22c are provided in a disk-shaped flange 22b of the terminal pole 22, and two fixing ribs 4a are provided at the abutting positions of the lid 1 to assemble together. In this constitution, the terminal pole 2 and its periphery can be reduced in size and weight. The current collector 22g is same as the current collector 2g in FIG. 3(A).

A mode of the annular pressing spring 6 used in the invention is described below. This mode is also applied in other embodiments illustrated hereinafter.

Sectional views and plan views of various annular pressing springs used in an embodiment of the invention are shown in FIG. 4,(A), (B), (C), and (D).

The pressing spring 6 shown in FIG. 4(A) is same as the pressing spring shown in FIG. 1, and the same spring plate material is used. It is composed of a slope 6d forming a notch 6c for generating a pressing force, successively to the opening 6a, and an outer flat portion 6b for transmitting pressing force through the lid. In the opening 6a, there is an opening cut 6e for stopping on the surface of the pole 2a, and the end face of the opening cut 6e is preferred to be at right angle or acute angle. The annular pressing spring 16 shown in FIG. 4(B) has an opening 16a, a slope 16d and an outer flat portion 16b, and a notch 16c is formed in the slope 16d. To reinforce the outer flat portion 16b, a large and thick spring material is used. Or, when desired to decrease the pressing force, the size or number of notches 16c may be adjusted. The opening 16a has a cut 16e. The annular pressing spring 17 in FIG. 4(C) is a modified form of the pressing spring 6 in FIG. 4(A), and it possesses an opening 17a, a slope 17d, and an outer flat portion 17b, and an outer circumferential notch 17c is formed for generating and adjusting the pressing force of the inner notch 17e for stopping the pole 2a. The pressing spring 18 in FIG. 4(D) is a further modified example, and is composed of an opening 18a, inner notch for stopping 18f, and a tongue 18b made of slope 18d and outer flat portion 18e. By varying the width of the tongue 18b, the pressing force can be adjusted. In this constitution, the inner notch 17e provided on the peripheral edge of the opening serves to compress the annular packing uniformly in the entire circumference, and can stop the pole 2a without inclination, and it is particularly effective for high speed work of pressing of opening. Incidentally, the annular pressing springs 6 shown in FIG. 4(A) to FIG. 4(D) are only examples, and the design can been changed as far as stopping and pressing effects on the pole 2a are available.

In FIG. 4(A), (B), the section along line A–A' shown in a plan view is a sectional view.

The form of the pole 2a is columnar, but it is not particularly limited a far as the opening of the annular pressing springs can be stopped as mentioned above, and the elliptical or square form may be applicable. In consideration of processing and assembling of parts, the columnar pole is preferred.

Figure 8:
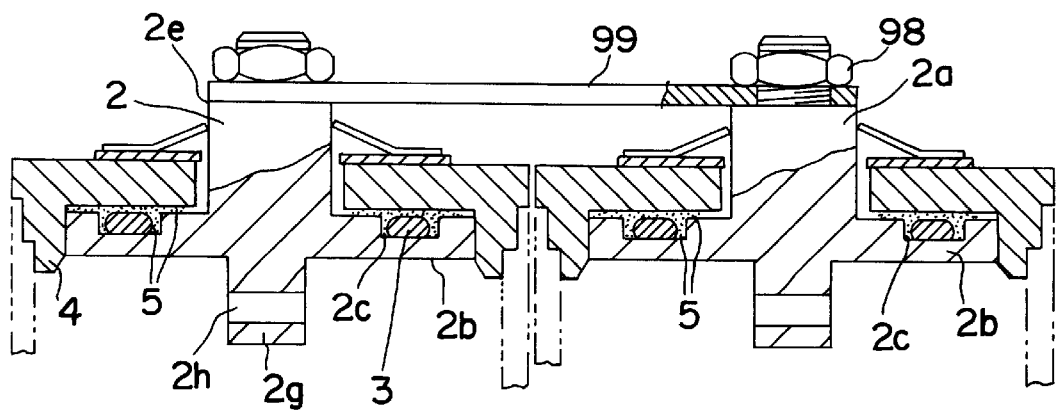
FIG. 8 is a sectional view showing the linkage structure of a terminal pole and a coupling plate in an embodiment of a sealed secondary cell of the invention.
Figure 12:
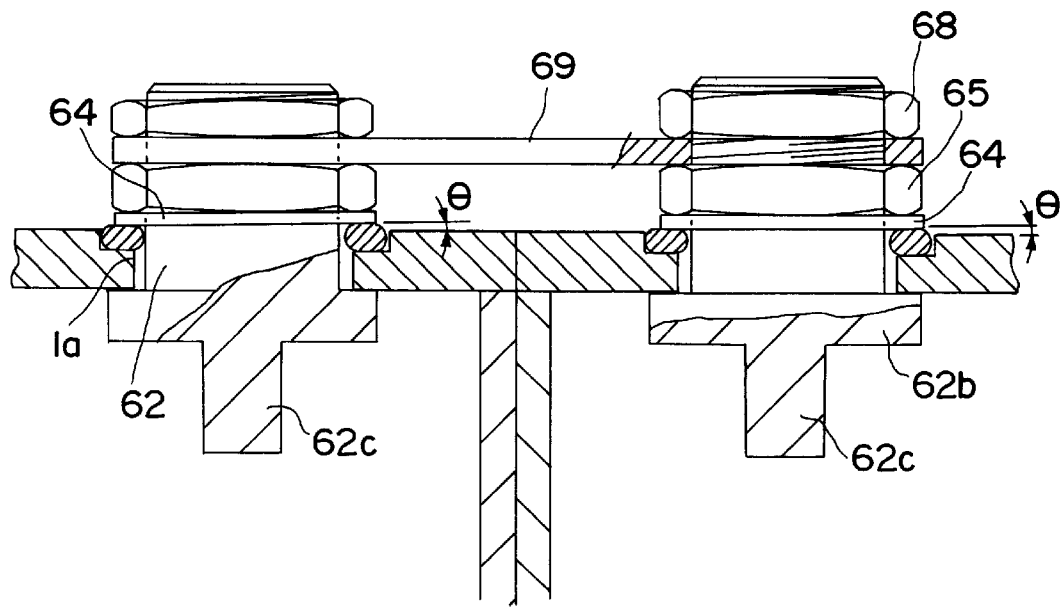
FIG. 12 is a sectional view showing the linkage structure of a terminal pole and coupling plate of conventional sealed secondary cells.

The form of the pole 2a as external terminal is described below while referring to FIG. 2 and FIG. 8. FIG. 8 shows a mode of coupling two external terminals shown in FIG. 2 by a coupling plate 99. In FIG. 8, at both ends of the coupling plate 99, holes are formed, and each hole is matched with a screw 2f in the upper part of the pole 2a, and fixed by a nut 98. At this time, the coupling plate 99 directly contacts with the step 2e of the terminal pole 2. FIG. 12 shows a mode of coupling two conventional external terminals in FIG. 9 by a couple plate 69. The sealed secondary cell is generally used by coupling a plurality of cells in order to obtain an electric power of medium or large capacity. Therefore, the form of the coupling part when coupling with other secondary cells is important. That is, if the internal resistance between the coupling plate and terminal pole is large, when multiple secondary cells are linked, it causes problems such as voltage drop and heat generation at the coupling junctions. Therefore, the junction is desirably coupled securely, and the internal resistance between external terminal and coupling plate is desireably decreased. In the conventional coupling structure shown in FIG. 12, the coupling plate 69 is put on the upper end of the nut 65 for fixing the terminal pole 62, and other nut 68 is set on the upper surface to fix the coupling plate 69. Accordingly, the current once flows from the terminal pole 62 into the coupling plate 69 through the metal washer 64 and nut 65. Yet, the contact state of the coupling plate 69 and the upper end of the nut 65 is not satisfactory, and the internal resistance is increased. By contrast, in the embodiment of the invention shown in FIG. 8, the coupling plate 9 directly contacts with the step 2e of the terminal pole 2, and the contact surface is wide and contact state is excellent. Therefore, the internal resistance is reduced.

Figure 5:
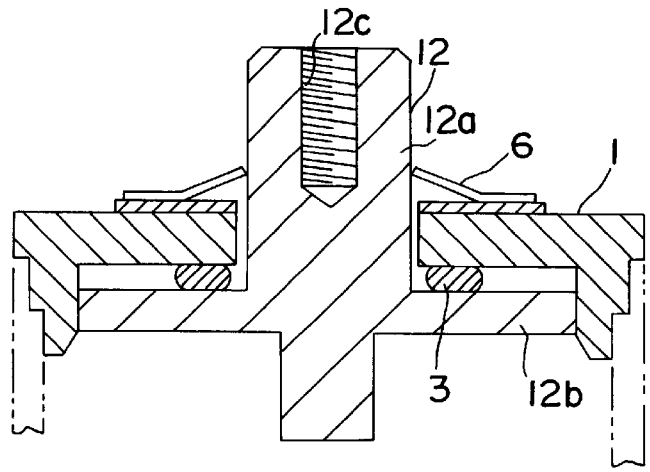
FIG. 5 is a sectional view of the terminal unit of a sealed secondary cell in a second embodiment of the invention.
Figure 7A:
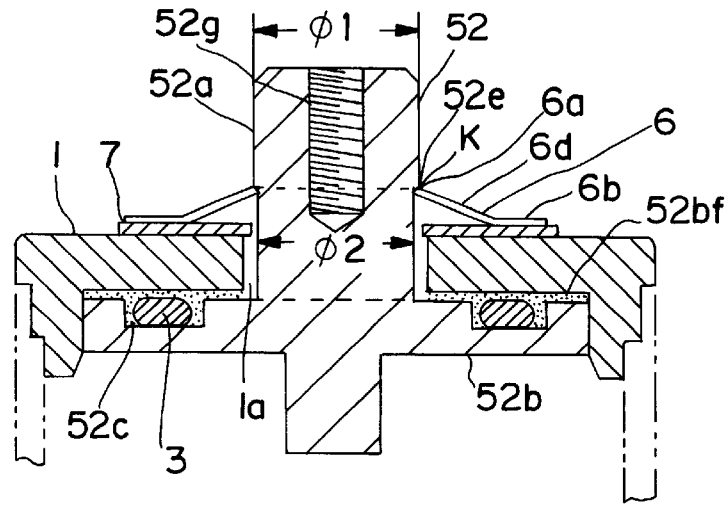
FIG. 7(A) is a sectional view near the terminal unit of a sealed secondary cell in a fourth embodiment of the invention.

Or as in the external terminal of the embodiment shown in FIG. 5 and FIG. 7A, by forming tap screws 12c, 52g in the pole of the terminal pole and putting the coupling plate on the upper end of the terminal poles 12, 52, it is possible to fix with bolts from above, and this constitution brings about the same effects as the coupling junction.

By the above means, moreover, the invention can prevent effects of external torque applied to the terminal pole, and the coupling junction of the coupling plate and external terminal may be composed as mentioned above.

In the same constitution, more preferably, a thin film layer of sealing agent 5 which is soft and repellent to moisture, aqueous solution or organic solvent, and stably resistant to electrolyte may be provided on the flange upper surface 2bf and lower side of the lid 1, or at least in the area contacting with the annular packing 3 of the flange upper surface. By forming the sealing agent 5, when using the battery in high temperature and high humidity condition, the electrolyte leakage suppression effect from the fixing part of the terminal pole 2 due to electric capillary action, especially in the case of alkaline electrolyte, may be further enhanced. As the sealing agent, asphalt pitch along may be used, or oil or fluoroplastic fine powder may be added to asphalt pitch in order to expand the applicable temperature range or enhance the adhesion or liquid repellent property. Besides, a compound material of adhesive matter such as polybutene and polyisobutylene having resistance to electrolyte or adhesion, and/or thermoplastic elastomer with fluoroplastic fine powder (for enhancing the liquid repellent property) may be dissolved and dispersed in solvent, and applied. As leakage preventive measure from the pole portion, it is proposed in Japanese Laid-Open Patent 59-114750 to apply blown asphalt or polyamide resin in the middle part of the terminal lead, cover the surface with hot melt resin, and fix in the lid by embedding with epoxy resin, but this method is not pressing and fixing by annular packing, and in the battery in which pressure elevates, it was difficult to prevent gas leak or accompanying electrolyte leak for a long period. In other proposed method (Japanese Laid-open Patent 55-143776), polyamide resin or a low elasticity sealing agent having epoxy resin of high molecular weight cured by polyamide resin or heterocyclic diamine is applied on the pole surface including the flange, and the lid is embedded with an alkaline resistant high elasticity sealing agent reacting with polyalkylene polyamine, but the polyamide resin or epoxy resin is likely to cause wetting of electrolyte, and leakage preventive effect is not enough for use of battery in high temperature and high humidity condition, and hence these method are not suited to the purpose and constitution of the invention.

The compression rate of the annular packing 3 is determined in consideration of the sectional area of packing, or diameter, peripheral length or hardness, within a range of 10% or 50% compression to the non-pressed height of the packing, with respect to a specific pressing force applied between the flange upper surface 2bf and lid 1 lower side (350 kgf in this embodiment, reference range 50 kgf to 660 kgf). If the compression rate is less than 10%, the area of the annular packing 3 contacting with the flange upper surface 2bf and lid 1 lower side is small, and nearly becomes a linear contact, and the electrolyte is likely to leak. Exceeding 50% of compression rate, the compression permanent set of the rubber elastic material increases, the pressing force drops significantly at high temperature or when used for a long period, and durability is insufficient. In ordinary design, the compression rate is preferred to be 20% to 40%. The depth of the annular groove 2c provided in the flange upper surface 2bf of the terminal pole 2 is set so as not to exceed 95% of the height of the annular packing 3 after compression.

A second embodiment by modifying the shape of the flange of the terminal pole is illustrated in FIG. 5. FIG. 5 is a sectional view near the terminal unit of the sealed secondary cell of the second embodiment of the invention. An annular packing 3 is put directly on a flat flange 12b of a terminal pole 12. The other constitution is the same as in the first embodiment. This constitution is applied to a relatively small battery and a pole 12a of a small diameter. In this case, stopping of the annular pressing spring 6 is easier, and inclination does not occur. Moreover, processing of the flange is easy. The upper part 12c of the pole 12a is a tap screw, which is used for fixing the coupling plate by tightening screw.

A third embodiment is shown in FIG. 6, in which the shape of the current collector of the terminal pole and the constitution of the rotation arresting portion of the terminal pole are modified.

Figure 6A:
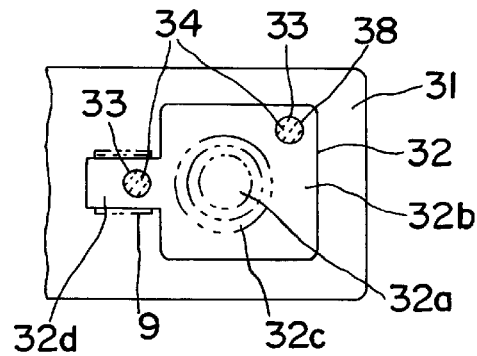
FIG. 6(A) is a bottom view of a current collector of a terminal pole of a sealed secondary cell in a third embodiment of the invention.
Figure 6B:
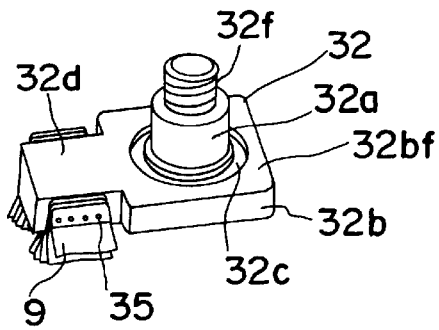
FIG. 6(B) is a perspective view of a current collector of the terminal pole shown in FIG. 6(A)
Figure 6C:
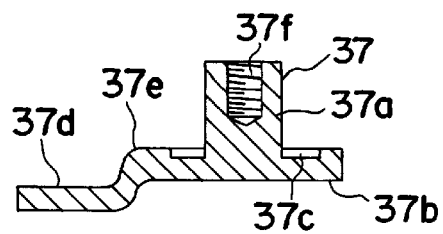
FIG. 6(C) is a sectional view of a current collector of a modified form of the terminal pole shown in FIG. 6(B)

FIG. 6(A) is a bottom view of a current collector of a terminal pole in an example of the invention, FIG. 6(B) is a perspective view of the current collector of the terminal pole shown in FIG. 6(A), and FIG. 6(C) is a sectional view of a current collector in other example.

In FIGS. 6(A), (B), (C), terminal poles 32, 37 are composed of flanges 32b, 37b, poles 32a, 37a, and current collectors 32d, 37d extended and formed in the horizontal direction from one side of the flanges 32b, 37b.

FIG. 6(A) and FIG. 6(B) are same in shape. As shown in FIG. 6(B), the current collector 32d is formed integrally from the flange 32b in the horizontal direction. Plural lead plate 9 led out from the plate group 8 are connected to a deposition part 35 by spot welding or the like. Using this terminal pole 32, the occupied dimension for current collection in the height direction in the battery is decreased, and the plate group 8 can be increased in height. As a result, it may contribute to enhancement of energy density of battery. To prevent the terminal pole 32 from rotating, as shown in FIG. 6(A), an engaging portion 33 in a hole form is formed in the flange 32b or current collector 32d, a fixed rib rotation blocking unit 34 in a same columnar form to penetrate into this hole projects to the lower side of the lid 31, and by engagement of the two, a pole rotation arresting portion 38 is formed. The terminal pole 37 shown in FIG. 6(C) is a modified form of the terminal pole 32 of FIG. 6(B), and the current collector 37d is formed in the flange 37b integrally or by welding in the horizontal direction through the step of the coupling part 37e. To reduce the size of the flange 37b, the annular groove 37c is useful by using the outer circumference of the pole 37a as the inside wall. In FIG. 6(A), the terminal pole 32 is fixed to the lid 31. The annular groove 32c is formed in the flange 32b. In FIG. 6(B) and FIG. 6(C), screws 32f, 37f are formed in the poles 32a, 37a.

Figure 7B:
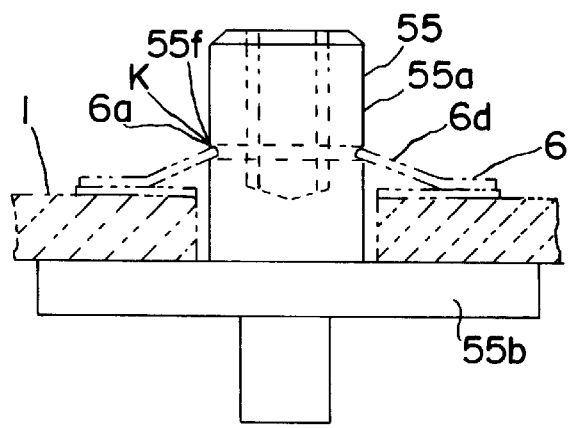
FIG. 7(B) is a side view of a second type terminal unit of a sealed secondary cell in a fourth embodiment of the invention.

A fourth embodiment varying the stopping form of the opening of the annular pressing spring and pole is explained by reference to FIG. 7(A) and FIG. (B). FIG. 7(A) is a sectional view of an example of the terminal unit used in the sealed secondary cell of the invention, and FIG. 7(B) is a sectional view of the other example. Terminal poles 52, 55 comprise flanges 52b, 55b, and poles 52a, 55a. As shown in FIG. 7(A), the outer diameter ($\phi$1) of the upper part of the pole 52a of the terminal pole 52 is set larger than the outer diameter $\phi$2 of the lower part of the pole by about 0.04 mm to 0.02 mm, and hence a step 52e is formed. This step 52e serves as stopping means. The opening 6a of the pressing spring 6 press-fitted into the pole is designed to be stopped at specified stopping position K by the step 52e. In FIG. 7(B), an annular thin groove 55f of 0.02 mm to 0.1 mm in depth is formed at the spring stopping position K. This groove 55f serves as stopping means. The opening 6a of the annular pressing spring 6 press-fitted into the pole 55a is inserted and fixed into the annular thin groove 55f, and forms the spring stopping position K. The other parts and constitution in FIGS. 7(A), 7(B) are same as in other embodiments. The terminal poles 52, 55 in the constitution shown in FIGS. 7(A), (B) can be applied in case the relation between the surface hardness of the poles 52a, 55a and the hardness of the opening cut 6e of the annular pressing spring 6 does not satisfy the condition specified in the first embodiment, and biting of the opening cut 6e into the pole surface may be insufficient to cause deviation due to vibration during use of the battery. Herein, if the diameter $\phi$2 of the pole small end portion of the lower part of the pole in FIG. 7(A) and the diameter of the annular thin groove 55f of the pole in FIG. 7(B) are less than 0.04 mm in diameter difference respectively from the diameters of the poles 52a, 55a, stopping effect of the spring opening 6a is insufficient, or when the diameter difference is more than 0.2 mm, fixing by stopping of the pole surface and spring opening 6a is loose, the spring opening 6a may be loosened during use of the battery, and fixing by sealing of the terminal poles 52, 55 may be partly loosened. Incidentally, a washer 7 is provided at the lower side of the pressing spring 6. In this embodiment, the lid 1 is made of synthetic resin molding, but it may be also replaced by a metal lid such as nickel plated steel plate, or a lid forming an insulating layer of resin and fixed rib by insert molding.

The lid strength can be further enhanced by this method.

In the invention, by altering the material of the constituent members, it can be applied to a sealed lithium secondary cell. That is, as the positive side of the terminal pole, a conductive corrosion resistance metal such as aluminum alloy is used, and as the negative side, a nickel plate copper or a nickel plated iron is used. As the annular packing, a material withstanding non-aqueous electrolyte is selected, such as silicone rubber and fluororubber. As the sealing agent, a flowable viscous matter mainly composed of viscous matter is selected from the above asphalt pitch, fluoroplastic elastomer and silicone. As the lid and battery jar, same plastic materials as in the foregoing embodiments may be used.

In such constitution, same as in the above sealed alkaline secondary cell, the sealed lithium cell maintaining a stable battery performance by keeping air and liquid tightness for a long period at high temperature, high humidity, and in a wide temperature range can be obtained.

EXAMPLES

Specific examples are described below.

Figure 9:
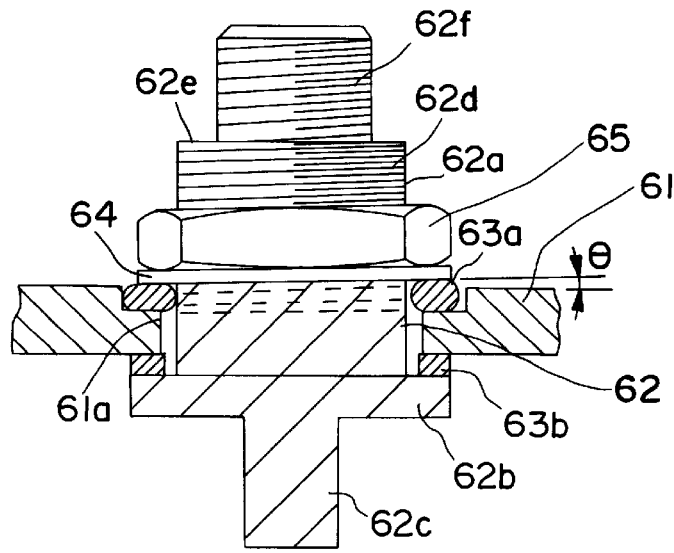
FIG. 9 is a sectional view of the terminal unit of a conventional sealed secondary cell.
Figure 10A:
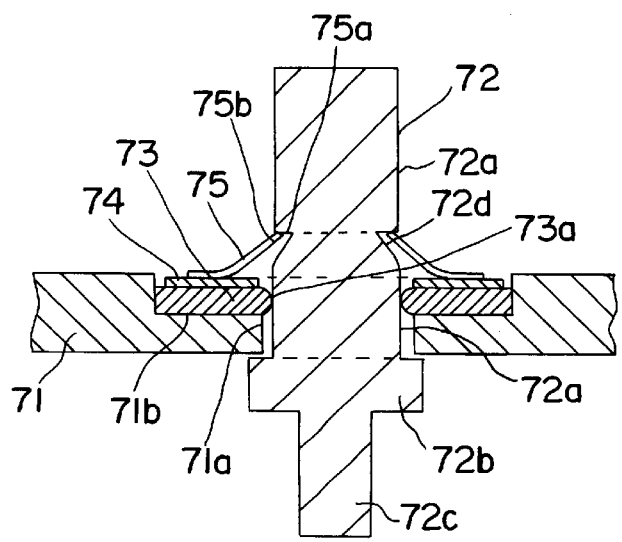
FIG. 10(A) is a sectional view near a terminal unit of a conventional sealed secondary cell.
Figure 10B:
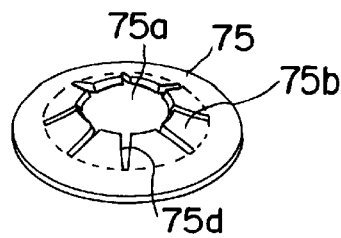
FIG. 10(B) is a perspective view of a conventional annular spring used with a terminal.
Figure 11:
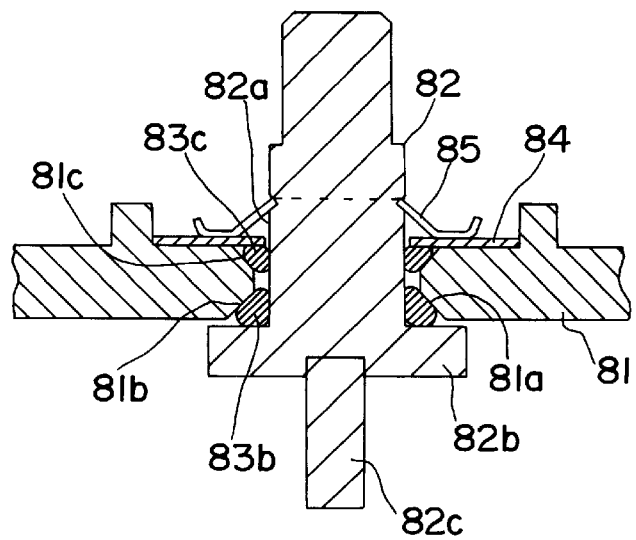
FIG. 11 is a sectional view of an alternative terminal unit of a conventional sealed secondary cell.

The sealed square secondary cells of the invention by enclosing the battery jar by using the assembled lid sealing and fixing the terminal poles in the lid terminal holes according to the constitution of the first embodiment shown in FIG. 2 and fourth embodiment in FIG. 7(A), and conventional square secondary cells closing the battery jar by using the assembled lid sealing and fixing the poles in the insert holes of the lid according to the conventional constitution shown in FIG. 9, FIG. 10, and FIG. 11 were fabricated, and the air tightness and liquid tightness of the pole portions, and presence or absence of rotation of the pole portions by applying a torque to the pole portion were comparatively studied, and the following results were obtained.

[1] Constituent conditions of test samples

The lid body, lid, and battery jar are all made of same polypropylene, the annular packings are ethylene propylene vulcanized in the same conditions, the poles are nickel plated soft steel of 12 mm in diameter in both first embodiment and prior art, the annular pressing springs and annular springs are made of stainless steel for spring, and the hardness of the opening cut is about Hv 400. The nuts and washers are nickel plated steel, and the pole in the fourth embodiment is 10 mm is diameter, and made of nickel plated tool steel in order to increase the strength of the tap screw. The surface hardness of the pole in the first embodiment is Hv 250, and the surface hardness of the pole in the fourth embodiment is Hv 365. The diameter of the pressing spring opening is about 0.1 mm to 0.15 mm smaller than the diameter of the poles 2a, 52a, and the diameter $\phi$2 of the pole smaller end in the fourth embodiment forms a step 52e of small diameter is about 0.1 mm. The pressing force of the annular pressing spring is based on 350 kgf in both first and fourth embodiments, and is set to stop and fix the opening. The compression rate of the annular packing is based on about 30%, and the compression rate of the prior art is adjusted in a range of 30% to 50% in consideration of the pressing force to the pole surface.

In the sealed battery of the first embodiment, the cell having a sealing agent thin film layer of asphalt pitch compound provided in the annular groove of the flange of the terminal pole and the corresponding lid lower side, and the cell without forming groove and sealing agent film layer were fabricated and compared.

The assembled lid body and assembled lid composed in the above conditions were presented for evaluation test in the following divisions. In the first embodiment, the cell without sealing agent film layer is example 1A, and the cell with sealing agent film layer is example 1B. In the fourth embodiment, the cell in the composition in FIG. 7(A) is example 2. In the prior art, the cell shown in FIG. 9 is prior art 1, the cell shown in FIG. 10(A) is prior art 2, and the cell shown-in FIG. 11 is prior art 3.

[2] Evaluation test and results (1) Air tightness test

Safety valves of test cells were removed and compressed nitrogen gas piping was connected instead, and the following pressure was applied, and presence or absence of gas leak from the terminal portions of positive pole and negative pole of the terminal pole was investigated. The results are shown in Table 1.

Gas application pressure: 1, 2, 3, 5, 10 kgf/cm$^2$

Number of samples: 50 cells each

Judgment: Presence of absence of bubbles from terminal portion of one or both of positive pole and negative pole in water was investigated.

Results: The following are known from Table 1. All cells of the embodiments were free from gas leak. In cells of prior arts, by contrast, gas leak was noted from 3 kgf/cm$^2$, and, in particular, prior art 2 was inferior in sealing of pole portion

TABLE 1

| | Gas pressure kgf/cm$^2$ | | | | |
|---|---|---|---|---|---|
| | No. of cells with gas leak | | | | |
| Samples | 1 | 2 | 3 | 5 | 10 |
| Embodiment | | | | | |
| 1A | 0 | 0 | 0 | 0 | 0 |
| 1B | 0 | 0 | 0 | 0 | 0 |
| 2 | 0 | 0 | 0 | 0 | 0 |
| Prior Art | | | | | |
| 1 | 0 | 0 | 1 | 2 | 2 |
| 2 | 0 | 2 | 12 | 23 | 50 |
| 3 | 0 | 0 | 2 | 8 | 23 |

(2) Long-term charge/discharge cycle test

A battery set was composed by connecting 50 cells of each sample in series, and two sets each were tested by charge and discharge cycles in the following conditions, and the battery set capacity before and after test, presence or absence of leak around terminal of positive or negative pole in each cell after test, and weight of decrease of electrolyte in each cell were investigated. The results are shown in Table 2.

Battery nominal capacity: 120 Ah

Charge, discharge condition: (1) Charge: By rapid charge at 40 A by temperature compensation voltage control, the battery was charged to a reference level of 105% of discharge capacity. After resting for 30 minutes, the battery was discharged to a terminal voltage of 50 V at 40 A constant current.

(2) The above operation was one cycle, and the test was conducted for 150 days by performing two cycles a day.

Test environments: Room temperature 25 to 40° C. (May to September), and ordinary humidity.

Checking of capacity of battery set: Before and after test, constant current of 24 A and terminal voltage of 50 V were confirmed.

Cell investigation method after test: Cells decreasing in weight equivalent to 5% of injected electrolyte amount defined as weight decreased cells due to gas leak. Peripheral edges of positive and negative terminals were checked by pH test papers, and cells showing alkaline reaction were defined as pole leak cells.

Results. The following are known from Table 2. All cells of the invention were slight in battery weight decrease, and neither cell weight loss nor pole leak cell was noted. By contrast, in prior arts, although variable with the method of constitution. the performance of battery set was lowered due to gas leak and electrolyte leak.

TABLE 2

| | | Evaluation item | | | |
|---|---|---|---|---|---|
| | | Battery set capacity (Ah) | | No. of cells decreased in | No. of cells |
| Samples | | Before test | After test | weight | with pole leak |
| Embodiment | | | | | |
| 1A | (1) | 121 | 118 | 0 | 0 |
| | (2) | 123 | 120 | 0 | 0 |
| 1B | (1) | 120 | 116.5 | 0 | 0 |
| | (2) | 124 | 120 | 0 | 0 |
| 2 | (1) | 122 | 118 | 0 | 0 |
| | (2) | 121 | 117.5 | 0 | 0 |
| Prior Art | | | | | |
| 1 | (1) | 122 | 110 | 1 | 5 |
| | (2) | 124 | 103 | 2 | 7 |
| 2 | (1) | 123 | 68 | 18 | 41 |
| | (2) | 125 | 75 | 12 | 32 |
| 3 | (1) | 122 | 90 | 5 | 11 |
| | (2) | 123 | 83 | 8 | 14 |

(3) Electrolyte leak test

Fifty fully charged cells of each sample were tested in the following temperature and humidity cycles, and the terminal portion peripheral edge was checked by pH test papers at every specific days. The results are shown in Table 3.

Checking schedule: 7 days, 14 days, 30 days, 50 days

No. of electrolyte leaks: Continuous count

Temperature, humidity cycles: 20 h at 65° C. and 90% humidity, 1 h at room temperature, and 3 h at 15° C./total 24 h (day), which was one cycle and repeated.

Results: As shown in Table 3, although the condition of the test is severe, the invention proved satisfactory. An extremely excellent electrolyte leak resistance improving effect was noted in example 1B, in particular, which formed sealing agent film layer of asphalt pitch compound in the terminal pole flange upper surface and lid lower side, contacting with annular packing.

TABLE 3

| | Test duration | | | |
|---|---|---|---|---|
| | No. of cells with gas leak | | | |
| Samples | 7 days | 14 days | 30 days | 50 days |
| Embodiment | | | | |
| 1A | 0 | 0 | 1 | 1 |
| 1B | 0 | 0 | 0 | 0 |
| 2 | 0 | 0 | 1 | 1 |
| Prior Art | | | | |
| 1 | 1 | 3 | 15 | 28 |

TABLE 3-continued

| | Test duration | | | |
|---|---|---|---|---|
| | No. of cells with gas leak | | | |
| Samples | 7 days | 14 days | 30 days | 50 days |
| 2 | 12 | 23 | 48 | 50 |
| 3 | 3 | 8 | 19 | 25 |

(4) Terminal unit fixing strength

The following specified torque was applied to the assembled lid body fixing terminal pole and the pole of the assembled lid, and it was investigated if the pole was turned or not. The results are shown in Table 4.

Applied torque: 50, 100, 200 kgf-cm

No. of tests: 50 sets at each torque

Results: As shown in Table 4, as the torque was increased up to 200 kgf-cm, there was no abnormality in the fixing portion of the cells of the invention, and rotation of pole was not observed. By contrast, in prior arts 2 and 3, many cells were rotated, and the fixing strength against rotation was small. That is, when connecting the coupling plate to the external terminal, it is known that possibility of applying torsional stress to the plate group inside the battery is high in the prior art. In prior art, structurally, rotating cells are relatively few, but inclination of nut and imperfect tightening seemed to be present at the time of tightening the pole with nuts, and rotating cells were not completely eliminated.

TABLE 4

| | Torque | | |
|---|---|---|---|
| | No. of cells rotated in terminal pole | | |
| Samples | 50 kgf cm | 100 kgf cm | 200 kgf cm |
| Embodiment | | | |
| 1A | 0 | 0 | 1 |
| 1B | 0 | 0 | 0 |
| 2 | 0 | 0 | 0 |
| Prior Art | | | |
| 1 | 0 | 3 | 7 |
| 2 | 32 | 47 | 50 |
| 3 | 8 | 21 | 50 |

[3] Overall evaluation

Thus, the sealed secondary cells of the invention, as compared with the conventional ones, are excellent in air and liquid tightness in wide environments including high temperature and high humidity, and the performance drop in long-period charge and discharge cycles is less, and if an external force is applied to the terminal pole, torsional stress is not applied to the plate group, and generation of internal short-circuit and lowering of battery performance can be prevented.

Thus, according to the invention as described herein, in the constitution of interposing an annular packing between the flat flange upper surface integrally formed on the terminal pole and the lid lower side, and stopping an annular pressing spring in the pole to fix the terminal pole to the lid, the annular packing is compressed in the vertical direction, and the terminal pole can be securely enclosed and fixed to the lid.

Moreover, by forming the rotation arresting portion of the terminal pole between the flange and lid lower side, if an external force is applied to the terminal pole, the terminal pole is not rotated, and hence torsional stress is not applied to the plate group, and generation of internal short-circuit and lowering of battery performance can be prevented, so that the durability of the battery can be maintained for a long period.

By optimizing the fitting shape, dimension and surface strength of the pole and the opening of the annular pressing spring, and vertical pressing force of the annular pressing spring, the sealing of the terminal portion of the sealed secondary cell is secured in a wide range of environments, and the durability may be maintained for a long-period.

By forming a sealing agent film layer between the flange upper surface contacting with the annular packing and the lid lower side, the electrolyte leak preventive property may be maintained for a long period.

According to the invention, a sealed secondary cell excellent in air tightness, liquid lead prevention, and terminal fixing strength, and capable of maintaining a stable performance for a long period can be presented.

In the invention, the secondary cell may be also composed by forming the positive plate containing manganese dioxide adding lithium hydroxide, molybdenum sulfide, and polyaniline, the negative plate containing lithium, and electrolyte containing solution dissolving salt such as $LiPF_6$ or $LiAsF_6$ is non-protonic solution such as 2-methyl tetrahydrofuran.

What is claimed:

1. A sealed secondary cell comprising:

a battery jar having an opening;

a plate group having at least one positive plate and at least one negative plate disposed in the battery jar;

electrolyte impregnated in the plate group;

a lid jar having a lower side disposed so as to cover the opening of the battery jar, the lid having at least one hole; and a terminal pole fixed to the lid and disposed through the at least one hole and electrically connected to at least one plate of the plate group, the terminal pole comprising
 i) a flange positioned at the lower side of the lid which has a first upper surface, a second upper surface forming an annular groove in said first upper surface, and a lower surface;
 ii) a pole projecting vertically from the first upper surface of the flange through the hole in the lid; and
 iii) a current collector on the lower surface of the flange and connected to the at least one plate;

an annular pressing spring having an opening with an inner diameter smaller than a maximum outer diameter of the terminal pole;

wherein the terminal pole has stopping means in at least a part of an outer circumference which engages the opening of the annular pressing spring; and an annular packing surrounding the terminal pole and disposed within said annular groove and between the second upper surface of the flange and the lower side of the lid, the annular packing being compressed in the vertical direction by an elastic force exerted by the annular pressing spring such that the second upper surface of the flange and the lower side of the lid are sealed by the annular packing.

2. A sealed secondary cell of claim 1, wherein the flange has an engagement portion, the lid has a rotation preventive portion, and the engagement portion and the rotation preventive portion are engaged with each other, thereby forming a rotation arresting portion of the terminal pole.

3. A sealed secondary cell of claim 2, wherein one of the engagement portion and rotation preventive portion is concave, and the other is convex, and the convex portion and the concave portion are engaged with each other to form the rotation preventive portion.

4. A sealed secondary cell of claim 2, wherein the flange has at least one linear side as the engagement portion, the lid has a side with a protruding portion projecting inside of the battery jar, and the negative plate possesses at least one of nickel and iron, and the electrolyte is an alkaline electrolyte.

5. A sealed secondary cell of claim 1, wherein the stopping means is a biting flaw formed on the outer circumference of the pole when pressing in the pressing spring, and an inner circumference of the opening of the annular pressing spring is stopped so as to be engaged with the biting flaw of the pole.

6. A sealed secondary cell of claim 1, wherein an inner periphery of the annular pressing spring forms a cut having an end surface of right angle or acute angle, and the cut is stopped in the biting flaw of the pole.

7. A sealed secondary cell of claim 1, wherein an inner periphery of the annular pressing spring forms plural cuts, and the plural cuts facilitate press-fitting of the annular pressing spring into the pole, and work to compress uniformly on the whole circumference of the annular packing.

8. A sealed secondary cell of claim 1, wherein the annular pressing spring is formed of a flat outer circumference, an inner circumference having the opening, and a slope between the outer circumference and inner circumference, a notch or a cut is formed in the inner circumference and slope, and the notch or cut adjusts the pressing force of the pressing spring.

9. A sealed secondary cell of claim 1, wherein the annular pressing spring forms a slope between an inner circumference having the opening and the outer circumference, a notch or a cut is formed in at least one selected from the group consisting of the inner circumference, outer circumference, and slope, and the notch or cut adjusts the pressing force of the pressing spring.

10. A sealed secondary cell of claim 1, wherein a surface hardness of the pole of the terminal pole is smaller than a hardness of an end portion of the opening of the annular pressing spring, by 100 Hv or more as Vickers hardness, and the surface hardness of the pole is in a range of Hv 150 to Hv 350.

11. A sealed secondary cell of claim 10, wherein a surface of the pole of the terminal pole is covered with a metal material.

12. A sealed secondary cell of claim 11, wherein the metal material contains at least nickel.

13. A sealed secondary cell of claim 1, wherein the inner diameter of the opening of the annular pressing spring is 0.05 mm to 0.4 mm smaller than the maximum outer diameter of the pole at a stopping position of the annular pressing spring.

14. A sealed secondary cell of claim 1, wherein the stopping means is an annular groove formed on the outer circumference of the pole, and the opening of the annular pressing spring is stopped in this groove.

15. A sealed secondary cell of claim 14, wherein the depth of the groove is 0.02 mm to 0.1 mm.

16. A sealed secondary cell of claim 1, wherein the stopping means is an annular step formed on the outer circumference of the pole, and the opening of the annular pressing spring is stopped in this step.

17. A sealed secondary cell of claim 16, wherein the depth of the step is 0.02 mm to 0.1 mm.

18. A sealed secondary cell of claim 1, wherein the pressing force of the pressing spring applied between the second upper surface of the flange and the lower side of the lid is in a range of 50 kgf to 600 kgf.

19. A sealed secondary cell of claim 1, wherein a sealing agent is composed between the second upper surface of the flange and the lower side of the lid, the sealing agent is made of a flowable material, and the lid and the flange are sealed by the annular packing and the sealing agent.

20. A sealed secondary cell of claim 19, wherein the sealing agent is placed around the annular packing.

21. A sealed secondary cell of claim 19, wherein the sealing agent contains at least one principal ingredient selected from the group consisting of asphalt pitch, fluoroplastic elastomer, and silicone resin.

22. A sealed secondary cell of claim 1, wherein the annular packing is an O-ring having at least one sectional shape of nearly circular shape and nearly polygonal shape.

23. A sealed secondary cell of claim 1, wherein the annular packing is composed of at least one selected from the group consisting of ethylene propylene rubber, nitrile rubber, butyl rubber, silicone rubber, and fluoro rubber.

24. A sealed secondary cell of claim 1, wherein the current collector forms a convex portion extended in the horizontal direction from one end of the flange, and one plate of the positive plate and negative plate is connected to this convex portion.

25. A sealed secondary cell of claim 1, wherein the current collector forms a convex portion extended in the horizontal direction with a step from one end of the flange, and one plate of the positive plate and negative plate is connected to this convex portion.

26. A sealed secondary cell of claim 1, wherein the current collector is formed at a lower side of the flange.

27. A sealed secondary cell of claim 1, wherein the pole has an upper surface having a flat plane, and a female thread formed on the upper surface.

28. A sealed secondary cell of claim 27, further comprising:
a coupling plate for coupling other cells,
wherein one end of the coupling plate is overlaid on the flat plane, and
the coupling plate is fixed by the female thread and male threads inserted into the female thread.

29. A sealed secondary cell of claim 1,
wherein the pole has a male thread formed on its upper surface,
an outer diameter of the male thread is smaller than an outer diameter of the pole, and a base of the male thread has a step of a flat plane parallel to a direction of diameter of the pole.

30. A sealed secondary cell of claim 29, further comprising:
a coupling plate for coupling other cells,
wherein one end of the coupling plate is overlaid on the flat plane, and the coupling plate is fixed by the male thread and a nut fixed by inserting the male thread.

31. A sealed secondary cell of claim 1,
wherein the plate group is composed of plural positive plates and negative plates separated mutually by separators,
the plate group impregnates the electrolyte,
the positive plate possesses an active substance of nickel compound,
the negative plate possesses at least one of cadmium and hydrogen occlusion alloy, and
the electrolyte is an alkaline electrolyte.

32. A sealed secondary cell of claim 1,
wherein the positive plate possesses one active substance selected from the group consisting of lithium hydroxide, manganese dioxide, molybdenum sulfide, and polyaniline,
the negative plate possesses lithium, and
the electrolyte possesses non-protonic organic solvent and lithium salt.

33. A sealed secondary cell of claim 1,
wherein the positive plate possesses an aluminum compound,
the negative plate possesses at least one of nickel and iron, and the electrolyte is an alkaline electrolyte.

34. A terminal pole for use in a sealed secondary cell comprising:
a flange which has a first upper surface, a second upper surface forming an annular groove in the first upper surface, and a lower surface;
a pole projecting vertically from the first upper surface of the flange; and
current collector on the lower surface of the flange.

35. The terminal pole of claim 34, wherein the flange further comprises an engagement portion for engaging a rotation preventive portion, of a battery lid to form a rotation arresting portion of a battery terminal pole.

36. The terminal pole of claim 34, wherein the flange further comprises a concave engagement portion for engaging a convex rotation preventive portion of a battery lid to form a rotation arresting portion of a battery terminal pole.

37. The terminal pole of claim 34, wherein the flange further comprises a convex engagement portion for engaging a concave rotation preventive portion of a battery lid to form a rotation arresting portion of a battery terminal pole.

38. The terminal pole of claim 35, wherein the engagement portion of the flange has at least one linear side for engaging a side projection inside the battery lid.

39. The terminal pole of claim 34, further comprising stopping means in at least a part of an outer circumference of the pole for engaging an opening in an annular pressing spring.

* * * * *